United States Statutory Invention Registration [19]

[11] Reg. Number: H367

Reed, Jr. et al. [43] Published: Nov. 3, 1987

[54] IN SITU DYE SMOKE

[75] Inventors: Russell Reed, Jr., Ridgecrest, Calif.; Jawaharlal Ramnarace, Fort Washington, Md.

[73] Assignee: The United States of America as represented by the Secretary of the Navy, Washington, D.C.

[21] Appl. No.: 57,888

[22] Filed: May 22, 1987

[51] Int. Cl.[4] ..... C06B 45/10

[52] U.S. Cl. ..... 149/19.4; 149/19.9; 149/75; 149/117

[56] References Cited

U.S. PATENT DOCUMENTS

| | | | |
|---|---|---|---|
| 1,339,142 | 5/1920 | Weisgerber . | |
| 2,995,526 | 8/1961 | De Ment | 252/305 |
| 3,046,168 | 7/1962 | Burkardt | 149/42 |
| 3,669,026 | 6/1972 | Flanagan | 149/19 |

*Primary Examiner*—Richard D. Lovering
*Assistant Examiner*—Susan Wolffe
*Attorney, Agent, or Firm*—William C. Townsend; W. Thom Skeer

[57] ABSTRACT

A dye smoke which burns efficiently and without flame consisting essentially of a hydroxyl terminated polybutadiene binder, the biuret trimer of hexamethylene diisocyanate curative, a leucoquinizarin dye referred to as 1,4,9,10-tetrahydroxyanthracene, and ammonium iodate oxidizer. The leucoquinizarin dye is oxidized and iodinated resulting in the iodoanthraquinone derivatives which produce the colored smoke.

3 Claims, No Drawings

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

IN SITU DYE SMOKE

BACKGROUND OF THE INVENTION

1. Field of the Invention

The present invention is directed to chemically produced colored smokes. More particularly, the invention is directed to an in situ dye smoke which burns efficiently and without flame.

2. Description of the Prior Art

Dye smoke currently in use contain potassium chlorate ($KClO_3$) oxidizer and pressed sugar-type binders. Liquid castable colored smoke compositions are known utilizing polymeric fuel binders such as polyacrylate, polyurethane or polyester which is then plasticized utilizing plasticizers such as bis-dinitropropylacrylate-formal, trimethylol ethane trinitrate or triethylene glycol dinitrate. These systems produce smoke by oxidizing the binder. The resulting heat volatilizes the dye. The gaseous dye then condenses in the air producing a colored smoke cloud. These systems are characterized by the destruction of part of the dye during the dispersion or volatilization process.

Compositions for chemically producing colored smokes are also known. The composition employs an iodine-based oxidizer and suitable fuel so that on combustion, either iodine or colored metallic iodides or both are formed. The color of the smoke is due to the reaction products and cannot be destroyed by the heat from the reaction. These compositions contain an oxidizer such as iodic acid, iodine pentoxide or a heavy metal iodate and a fuel binder such as polyvinyltetrazole resin which also contains a light metal fuel such as aluminum, magnesium, titanium, boron and zirconium.

The oxidizer and fuel of conventional smoke systems burn predominantly outside the smoke cannister, resulting in flaming. The flames can start brush fires if the smoke is used as a marker. Oxidizers such as potassium chlorate and light metal fuels such as aluminum and magnesium generate large amounts of heat which pyrolyze the dye. This destruction of part of the dye reduces the efficiency of the dye smoke.

SUMMARY OF THE INVENTION

One object of this invention is a dye smoke which burns without a flame.

Another object of this invention is a dye smoke which uses a mild oxidizer that deflagrates at low temperatures.

According to the present invention a smoke dye which will burn efficiently and without flame consists essentially of a hydroxyl terminated polybutadiene binder, the biuret trimer of hexamethylene diisocyanate curative, leucoquinizarin also referred to as 1,4,9,10-tetrahydroxyanthracene, and ammonium iodate oxidizer. Leucoquinizarin is oxidized and iodinated resulting in the formation of a smoke cloud containing iodoanthraquinone dyes.

DETAILED DESCRIPTION OF THE INVENTION

The pyrotechnic composition for producing colored smoke of the present invention consists essentially of four main components. These components are a hydroxyl terminated polybutadiene binder, the biuret trimer of hexamethylene diisocyanate curative, leucoquinizarin also referred to as 1,4,9,10-tetrahydroxyanthracene, and ammonium iodate oxidizer.

The ammonium iodate oxidizer burns cooly due to the amount of hydrogen present in the molecule. There is little of no destruction of the dye caused by heat as in conventional systems. As a result, the pyrotechnic composition produces dye smoke efficiently. The iodine which forms during oxidation iodinates the leucoquinizarin starting material forming iodoanthraquinone dyes. Since both iodine and its derivatives are flame retardants, the resulting dye is also a flame retardant. This gives the invention the advantage of burning with little or no flame. In general, about 30 to about 36 percent by weight hydroxyl terminated polybutadiene binder and about 40 to about 43 percent by weight ammonium iodate oxidizer may be used. About 21 to about 30 weight percent of leucoquinizarin, also referred to as 1,4,9,10-tetrahydroxyanthracene may be used. The preferred amount if 30 percent by weight since that yields a greater amount of smoke. However, the composition becomes stiff and hard to process when it contains large weight percentages of leucoquinizarin. This can be overcome by using a volatile organic solvent such as methylene chloride during processing. Use of the solvent may allow use of up to about 40 percent by weight leucoquinizarin with a corresponding reduction in the amount of ammonium oxidizer. Dye precursors other than leucoquinizarin may also be suitable for use in this invention. The following examples have been provided to illustrate but not limit the invention.

EXAMPLE 1

5.5 g of hexamethylene diisocyanate curative commonly known as Desmodur N-100 was added to 24.0 g of hydroxyl terminated polybutadiene binder (HTPB). 35.5 g of ammonium iodate ($NH_4IO_3$) was then added to the mixture. 17.0 g of leucoquinizarin, also referred to as 1,4,9,10-tetrahydroxyanthracene was added along with 0.10 g of dibutyltin dilaurate catalyst. The overall composition was 36 percent by weight HTPB binder, 43 percent by weight ammonium iodate oxidizer and 21 percent by weight leucoquinizarin.

The mixture was cured overnight. When ignited, the mixture burned to give large amounts of a yellow-orange smoke. When ignited with an open flame, the flame was quickly extinguished while deflagration continued producing large amounts of yellow-orange smoke.

EXAMPLE 2

2.0 g of hexamethylene diisocyanate curative commonly known as Desmodur N-100 was added to 13.0 g of hydroxyl terminated polybutadiene binder. 15.0 g of leucoquinizarin (1,4,9,10-tetrahydroxyanthracene) was added followed by 20.0 g of ammonium iodate ($Na_4IO_3$) oxidizer. After mixing, the composition had the consistency of a stiff paste. The overall composition by weight was 30% HTPB binder, 40% ammonium iodate ($Na_4IO_3$) oxidizer, and 30% leucoquinizarin.

The mixture was cured overnight at ambient temperature to give a tough, rubbery cured smoke composition. The mixture burned flamelessly producing a dense yellow-orange smoke cloud. The smoke cannister did not ignite the dry brush upon which it rested during deflagration.

Modifications and variations of the present invention are possible. It should be understood that, within the scope of the appended claims, the invention may be practiced otherwise than as specifically described.

What is claimed is:

1. A pyrotechnic composition for producing colored smoke comprising:

from about 30 to about 36 percent by weight hydroxyl terminated polybutadiene binder;

from about 0.04 to about 0.07 percent by weight biuret trimer of hexamethylene diisocyanate curative;

from about 21 to about 30 percent by weight 1,4,9,10-tetrahydroxyanthracene; and from about 40 to about 43 percent by weight ammonium iodate.

2. The composition as defined in claim 1 and including about 0.001 percent by weight of the catalyst dibutyltin dilaurate.

3. The composition as defined in claim 1 wherein the 1,4,9,10-tetrahydroxyanthracene ranges from about 30 to about 40 percent by weight and the ammonium iodate ranges from about 30 to about 40 percent weight.

* * * * *